United States Patent
Hiroki et al.

(10) Patent No.: US 11,072,309 B2
(45) Date of Patent: Jul. 27, 2021

(54) MOBILE TERMINAL DEVICE AND VEHICLE CONTROL SYSTEM

(71) Applicant: TOYOTA JIDOSHA KABUSHIKI KAISHA, Toyota (JP)

(72) Inventors: Daisuke Hiroki, Okazaki (JP); Hiroki Okada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/504,689

(22) Filed: Jul. 8, 2019

(65) Prior Publication Data

US 2020/0114872 A1    Apr. 16, 2020

(30) Foreign Application Priority Data

Oct. 12, 2018 (JP) .............................. JP2018-193679

(51) Int. Cl.
*B60R 25/24* (2013.01)
*G06K 7/14* (2006.01)

(52) U.S. Cl.
CPC ............ *B60R 25/24* (2013.01); *G06K 7/1413* (2013.01); *G06K 7/1417* (2013.01); *B60R 2325/205* (2013.01)

(58) Field of Classification Search
CPC .... G06K 7/1413; G06K 7/1417; B60R 25/24; B60R 2325/205
See application file for complete search history.

(56) References Cited

U.S. PATENT DOCUMENTS

| | | | | | |
|---|---|---|---|---|---|
| 4,749,873 | A | * | 6/1988 | Mutoh | B60R 25/24 307/10.2 |
| 5,283,431 | A | * | 2/1994 | Rhine | B60R 25/04 250/229 |
| 5,521,443 | A | * | 5/1996 | Imura | B60L 3/0069 307/10.2 |
| 5,889,472 | A | * | 3/1999 | Nagel | B60R 25/04 340/426.28 |
| 5,940,007 | A | * | 8/1999 | Brinkmeyer | G07C 9/00309 340/12.29 |
| 6,434,983 | B1 | * | 8/2002 | Perillat | B60R 25/04 180/287 |
| 10,107,888 | B1 | * | 10/2018 | Choi | B60Q 1/323 |
| 10,266,149 | B1 | * | 4/2019 | DeCia | B60R 25/24 |

(Continued)

FOREIGN PATENT DOCUMENTS

| | | |
|---|---|---|
| JP | 2012-087592 A | 5/2012 |
| JP | 2018204183 A * | 12/2018 |

OTHER PUBLICATIONS

"Appearance of 'R9Darkmoon', a two-screen smartphone with an electronic paper on a rear surface—Landing in Japan scheduled;" My Navi News; Sep. 7, 2015.

*Primary Examiner* — Daniel I Walsh
(74) *Attorney, Agent, or Firm* — Oliff PLC

(57) ABSTRACT

A mobile terminal device is operated by a battery, performs wireless communication with a predetermined associated vehicle, and is available as an electronic key for the vehicle. The mobile terminal device includes a display unit including an electronic paper, and a terminal controller configured to display a predetermined code for unlocking the vehicle on the electronic paper when a remaining amount of the battery is equal to or smaller than a predetermined value.

6 Claims, 4 Drawing Sheets

(56) References Cited

U.S. PATENT DOCUMENTS

| | | | |
|---|---|---|---|
| 10,332,327 B2* | 6/2019 | Link, II | G07C 9/38 |
| 10,589,720 B1* | 3/2020 | Tang | G07C 5/008 |
| 10,591,576 B1* | 3/2020 | Tang | G01S 5/0036 |
| 10,682,980 B1* | 6/2020 | Ghamsari | B60R 25/24 |
| 10,769,929 B2* | 9/2020 | Qiu | G08B 21/182 |
| 2001/0050580 A1* | 12/2001 | O'Toole | G06K 19/0712 |
| | | | 327/158 |
| 2003/0095040 A1* | 5/2003 | Shimomura | B60R 25/1004 |
| | | | 340/426.13 |
| 2003/0222758 A1* | 12/2003 | Willats | B60R 25/24 |
| | | | 340/5.72 |
| 2007/0126561 A1* | 6/2007 | Breed | B60R 25/2081 |
| | | | 340/426.13 |
| 2007/0247300 A1* | 10/2007 | Schindler | B60R 25/045 |
| | | | 340/502 |
| 2007/0290794 A1* | 12/2007 | Teshima | B60R 25/403 |
| | | | 340/5.64 |
| 2008/0086242 A1* | 4/2008 | Bennett | B60R 25/2009 |
| | | | 701/2 |
| 2008/0156885 A1* | 7/2008 | Landau | G06K 19/0702 |
| | | | 235/492 |
| 2009/0113961 A1* | 5/2009 | Muller | B60R 25/24 |
| | | | 70/256 |
| 2009/0157354 A1* | 6/2009 | Ady | G06Q 20/3674 |
| | | | 702/183 |
| 2010/0241857 A1* | 9/2010 | Okude | H04L 9/3226 |
| | | | 713/168 |
| 2013/0005404 A1* | 1/2013 | Bremer | G06K 7/1413 |
| | | | 455/566 |
| 2013/0116860 A1* | 5/2013 | Kawai | B60R 25/24 |
| | | | 701/2 |
| 2013/0162421 A1* | 6/2013 | Inaguma | H04B 5/0031 |
| | | | 340/438 |
| 2015/0161836 A1* | 6/2015 | Park | B60R 25/2045 |
| | | | 340/5.51 |
| 2016/0208541 A1* | 7/2016 | Goto | B60R 25/245 |
| 2016/0259439 A1* | 9/2016 | Buttolo | G06F 3/04883 |
| 2016/0358198 A1* | 12/2016 | Bakhoum | G06Q 30/0226 |
| 2017/0034766 A1* | 2/2017 | Christ | H04M 1/72577 |
| 2017/0172448 A1* | 6/2017 | Shin | A61B 5/053 |
| 2017/0200336 A1* | 7/2017 | Schmidt | G08C 17/02 |
| 2017/0277361 A1* | 9/2017 | Schulze | G06F 9/451 |
| 2018/0072267 A1* | 3/2018 | Shim | A61B 5/0022 |
| 2019/0047511 A1* | 2/2019 | Link, II | B60R 25/24 |
| 2019/0066424 A1* | 2/2019 | Hassani | B60R 25/04 |
| 2019/0362272 A1* | 11/2019 | Kato | G06Q 30/0645 |
| 2020/0031311 A1* | 1/2020 | Farah | B60R 25/23 |
| 2020/0114872 A1* | 4/2020 | Hiroki | B60R 25/305 |
| 2020/0172055 A1* | 6/2020 | Lee | G07C 9/00309 |
| 2020/0310461 A1* | 10/2020 | Kaufman | G05D 1/0088 |

* cited by examiner

MOBILE TERMINAL DEVICE AND VEHICLE CONTROL SYSTEM

INCORPORATION BY REFERENCE

The disclosure of Japanese Patent Application No. 2018-193679 filed on Oct. 12, 2018 including the specification, drawings and abstract is incorporated herein by reference in its entirety.

BACKGROUND

1. Technical Field

The present disclosure relates to a mobile terminal device and a vehicle control system.

2. Description of Related Art

A smart entry system is known as an authentication system for vehicles. The smart entry system has, for example, a function of causing a vehicle to permit a manipulation such as unlocking of a vehicle door by a user or startup of a vehicle engine, by a vehicle-mounted device performing wireless communication with a limited communication distance with an electronic key possessed by the user to authenticate the electronic key.

In such a smart entry system, when a remaining amount of a battery built in the electronic key is exhausted, the electronic key cannot perform wireless communication. Therefore, the function as described above cannot be executed. As a countermeasure, Japanese Unexamined Patent Application Publication No. 2012-087592 (JP 2012-087592 A) discloses that an electronic key includes an electronic paper, and when a voltage of a battery of the electronic key becomes equal to or lower than a threshold value, a guidance of a vehicle manipulation for emergency using, for example, a mechanical key or transponder communication that does not use power of the battery included in the electronic key is displayed on the electronic paper. In this electronic key, the electronic paper maintains the guidance display even when the remaining amount of the battery is actually exhausted. Therefore, the user can manipulate the vehicle by referring to the guidance display.

On the other hand, mobile terminal devices such as smartphones have become widespread, and it has become common for users to always possess the mobile terminal devices. Therefore, in a smart entry system, it is conceivable to improve convenience of a user by using such a mobile terminal device instead of an electronic key. Literature "Appearance of 'R9Darkmoon', a two-screen smartphone with an electronic paper on a rear surface—Landing in Japan scheduled" ([online], Sep. 7, 2015, My Navi News, [searched on Oct. 2, 2018], Internet <URL: https://news.mynavi.jparticle/20150907-r9:amp/>) discloses a smartphone including a liquid crystal display on one surface and an electronic paper on the other surface, in which a code for a boarding ticket can be displayed on the electronic paper.

SUMMARY

In the smart entry system, in a case in which a general mobile terminal device such as a smartphone is used instead of the electronic key, wireless communication cannot be performed and the above-described function cannot be executed when a remaining amount of the battery built in the mobile terminal device decreases, a countermeasure is needed.

The present disclosure desirably provides a mobile terminal device and a vehicle control system that enable a vehicle to be manipulated even when a remaining amount of a battery of the mobile terminal device such as a smartphone is exhausted in a case in which the mobile terminal device is used as an electronic key for the vehicle.

A first aspect of the present disclosure relates to a mobile terminal device. The mobile terminal device is operated by a battery, performs wireless communication with a predetermined associated vehicle, and is available as an electronic key for the vehicle. The mobile terminal device includes a display unit including an electronic paper; and a terminal controller configured to display a predetermined code for unlocking the vehicle on the electronic paper when a remaining amount of the battery is equal to or smaller than a predetermined value.

A second aspect of the present disclosure relates to a vehicle control system. The vehicle control system includes a mobile terminal device and a vehicle associated with the mobile terminal device. The mobile terminal device is operated by a battery, performs wireless communication with a predetermined associated vehicle, and is available as an electronic key for the vehicle, and includes a display unit including an electronic paper, and a terminal controller configured to display a predetermined code for unlocking the vehicle on the electronic paper when a remaining amount of the battery is equal to or smaller than a predetermined value. The vehicle includes an acquisition unit configured to acquire the predetermined code displayed on the display unit of the mobile terminal device, and a vehicle controller configured to cause the acquisition unit to acquire the predetermined code when a radio signal from the mobile terminal device is not receivable, and permit unlocking of the vehicle when authentication using the acquired predetermined code is successful.

In the vehicle control system according to the second aspect of the present disclosure, the vehicle controller may be configured to cause the authentication not to be successful even when the acquisition unit acquires again the predetermined code used for the successful authentication after the authentication is successful.

In the vehicle control system according to the second aspect of the present disclosure, the acquisition unit may be a camera that acquires the predetermined code by imaging the predetermined code.

In the vehicle control system according to the second aspect of the present disclosure, the vehicle controller may be configured to turn on a light included in the vehicle and perform imaging using the camera in a case in which the radio signal from the mobile terminal device is not receivable when the vehicle controller detects a touch manipulation with respect to a door handle included in the vehicle.

A third aspect of the present disclosure relates to a vehicle control system. The vehicle control system includes a mobile terminal device, a vehicle associated with the mobile terminal device, and a server configured to communicate with the mobile terminal device and the vehicle. The mobile terminal device is operated by a battery, performs wireless communication with a predetermined associated vehicle, and is available as an electronic key for the vehicle, and includes a display unit including an electronic paper, and a terminal controller configured to display a predetermined code for unlocking the vehicle on the electronic paper when a remaining amount of the battery is equal to or smaller than a predetermined value. The vehicle includes an acquisition unit configured to acquire the predetermined code displayed on the display unit of the mobile terminal device, and a vehicle controller. The terminal controller is configured to further transmit a first notification to the server when the remaining amount of the battery is equal to or smaller than the predetermined value, the server is configured to specify the vehicle as the vehicle associated with the mobile terminal device and transmit a second notification to permit the vehicle to execute authentication with the predetermined code when the server receives the first notification, and the vehicle controller is configured to cause the acquisition unit to acquire the predetermined code, and permit unlocking of the vehicle when authentication using the acquired predetermined code is successful in a case in which a radio signal from the mobile terminal device is not receivable when the vehicle controller receives the second notification.

In the vehicle control system according to the third aspect of the present disclosure, the vehicle controller may be configured to cause the authentication not to be successful even when the acquisition unit acquires again the predetermined code used for the successful authentication after the authentication is successful.

In the vehicle control system according to the third aspect of the present disclosure, the acquisition unit may be a camera that acquires the predetermined code by imaging the predetermined code.

In the vehicle control system according to the third aspect of the present disclosure, the vehicle controller may be configured to turn on a light included in the vehicle and perform imaging using the camera in a case in which the radio signal from the mobile terminal device is not receivable when the vehicle controller detects a touch manipulation with respect to a door handle included in the vehicle.

As described above, according to the aspects of the present disclosure, it is possible to desirably provide the mobile terminal device and the vehicle control system that enable the vehicle to be manipulated even when a remaining amount of a battery of the mobile terminal device such as a smartphone is exhausted in a case in which the mobile terminal device is used as an electronic key of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

In a vehicle control system according to the present disclosure, a code is displayed on a display unit of a mobile terminal device when a remaining amount of a battery of the mobile terminal device decreases. The display unit is an electronic paper, and the display is maintained even when the remaining amount of the battery is exhausted. When a user presents the code to the vehicle, the vehicle performs authentication, and when the authentication is successful, unlocking or the like is performed.

First Embodiment

Hereinafter, a first embodiment of the present disclosure will be described in detail with reference to the drawings.

Configuration

Figure 1:
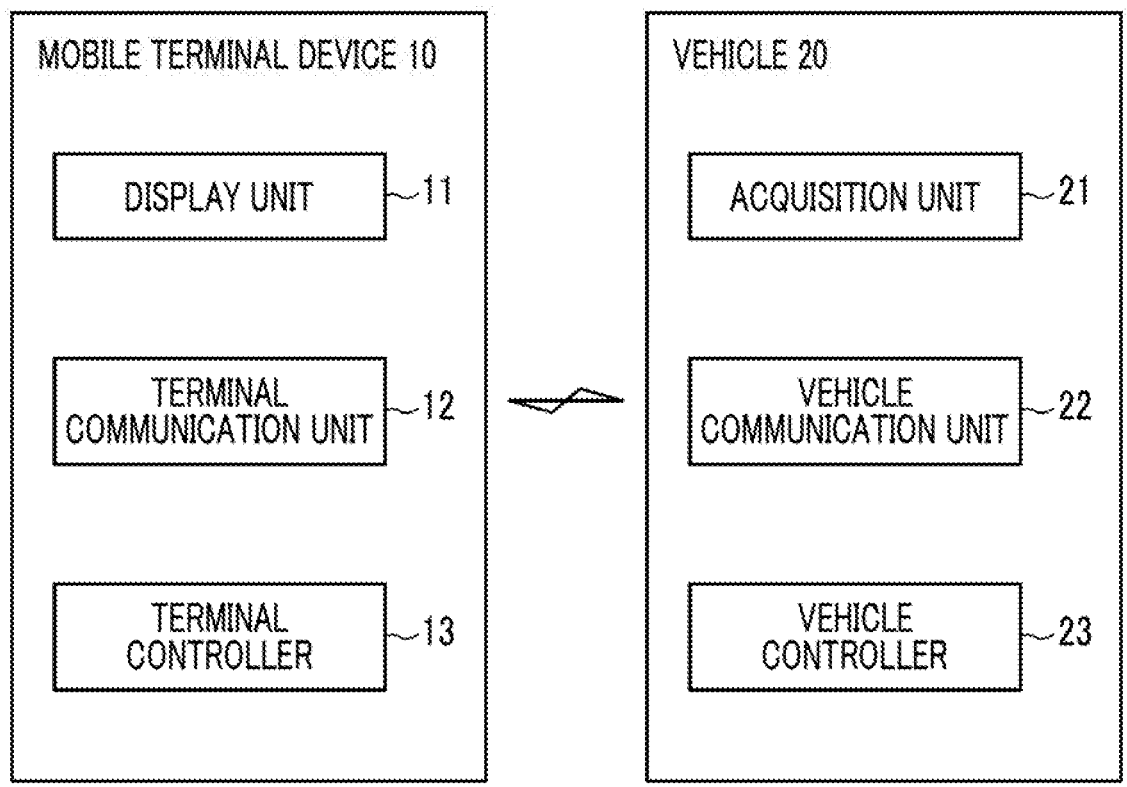
FIG. 1 is a functional block diagram of a vehicle control system according to a first embodiment of the present disclosure.

FIG. 1 illustrates a functional block diagram of a vehicle control system 1 in the embodiment. The vehicle control system 1 includes a mobile terminal device 10 and a vehicle 20.

The mobile terminal device 10 is, for example, a smartphone that is possessed by a user. The mobile terminal device 10 includes a display unit 11, a terminal communication unit 12, and a terminal controller 13. The display unit 11 is a display device using at least one electronic paper. The mobile terminal device 10 may further include one or more other display devices, and the other display devices may be liquid crystal displays other than the electronic paper. The electronic paper is, for example, an electrophoretic display medium in which colored particles contained in a fluid are moved by an electric field, and has a property that the electronic paper does not consume power except when content of a display is rewritten and can maintain the content of the display without power consumption. The terminal communication unit 12 transmits and receives radio signals to and from other devices. The terminal controller 13 controls the display unit 11, the terminal communication unit 12, or other units (not illustrated) included in the mobile terminal device 10.

The vehicle 20 includes an acquisition unit 21, a vehicle communication unit 22, and a vehicle controller 23. The acquisition unit 21 acquires code displayed on the display unit 11 of the mobile terminal device 10 as will be described below. The vehicle communication unit 22 transmits and receives a radio signal to and from an external device. The vehicle controller 23 controls the acquisition unit 21, the vehicle communication unit 22, or the other units further included in the vehicle 20. A function of the vehicle controller 23 may be realized by a plurality of electronic control units (ECUs) that perform authentication or vehicle manipulation, respectively.

The mobile terminal device 10 has a function of an electronic key of the vehicle 20 associated in advance when the remaining amount of the battery is sufficient. That is, when the remaining amount of the battery of the mobile terminal device 10 is sufficient, the terminal communication unit 12 communicates with the vehicle communication unit 22 within a communicable distance, for example, through wireless communication in a Bluetooth (registered trademark) Low Energy (BLE) scheme, as a normal operation. In the normal operation, for example, when the vehicle controller 23 determines that the mobile terminal device 10 is a regular mobile terminal device associated with the vehicle 20 by collating an identifier of the mobile terminal device 10 included in content of the communication with an identifier of the regular mobile terminal device associated with the vehicle 20 in advance, the vehicle controller 23 determines that authentication is successful and permits a door to be unlocked or locked by a touch manipulation on a door handle by the user, or an engine to be started up by pressing of a push start switch. The mobile terminal device 10 can function as such an electronic key by executing a predetermined application.

Process

Figure 2:
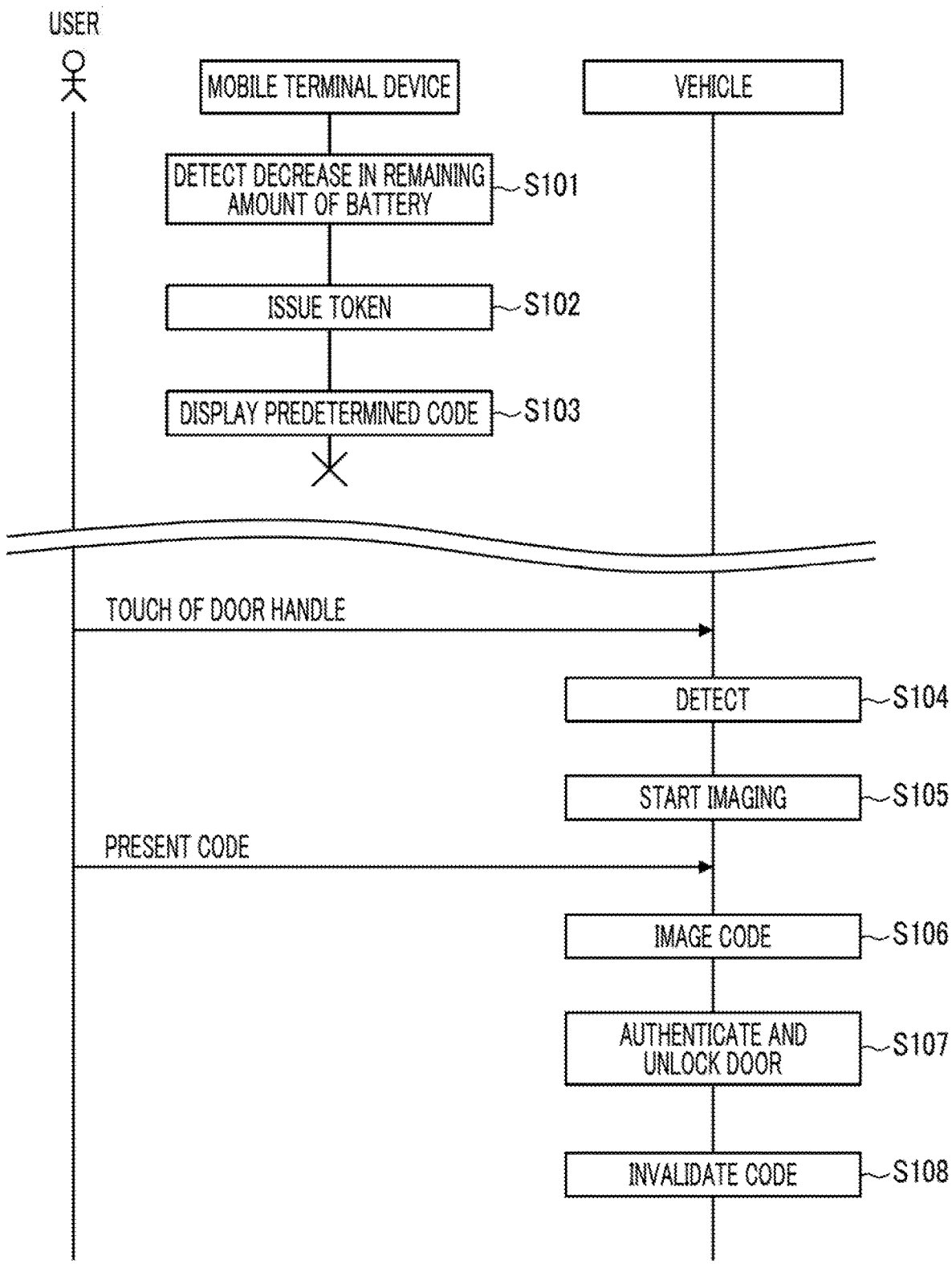
FIG. 2 is a sequence diagram illustrating an example of a process of the vehicle control system according to the first embodiment of the present disclosure.

A process in a case in which the remaining amount of the battery of the mobile terminal device 10 decreases in the vehicle control system 1 according to the embodiment will be described. FIG. 2 is a sequence diagram illustrating an example of this process.

(Step S101): The terminal controller 13 detects that the remaining amount of the battery built in the mobile terminal device 10 has decreased. A method of determining the decrease in the remaining amount is not limited. For example, an output voltage of the battery can be monitored and a determination can be made that the remaining amount has decreased when the output voltage becomes equal to or smaller than a predetermined value.

(Step S102): The terminal controller 13 issues a token. The token is data that is used to generate a code to be described below. The terminal controller 13 holds, for example, a plurality of tokens in advance, and selects and issues an unused token among the tokens. It is desirable for these tokens to be unique tokens not held by other mobile terminal devices.

(Step S103): The terminal controller 13 generates a code based on the token and causes the display unit 11 to display the code. Although a form of the code is not limited, for example, a QR code (registered trademark), a barcode, a character string, or the like is available. Since an unused token is selected in step S102, the generated code is also a code that is not displayed.

After step S103, even when the mobile terminal device 10 enters a shutdown state due to battery exhaustion, the electronic paper of the display unit 11 maintains a state in which the code is displayed.

Processes of steps S104 to S108 below are executed when the user performs an unlocking manipulation of the vehicle after step S103 described above.

(Step S104): When the user touches the door handle, the vehicle controller 23 detects the touch of the door handle using a sensor included in the vehicle 20. When the vehicle controller 23 cannot receive a radio signal from the mobile terminal device 10 via the vehicle communication unit 22, the vehicle controller 23 can determine that the mobile terminal device 10 exists near the vehicle 20, but is likely to be unable to perform communication, and execute the following process. The battery of the mobile terminal device 10 may be charged, the mobile terminal device 10 may be activated, and communication may be possible. In this case, the mobile terminal device 10 and the vehicle 20 may perform the normal operation described above, and do not perform subsequent processes.

(Step S105): The vehicle controller 23 controls the acquisition unit 21 to prepare to acquire a code displayed on the display unit 11 of the mobile terminal device 10. In the embodiment, as an example, the acquisition unit 21 is a camera. The vehicle controller 23 activates a camera included in the vehicle to start imaging. The acquisition unit 21 is not limited to the camera as long as the code displayed on the display unit 11 can be acquired, and may be various code readers other than the camera. Further, when the camera is used, the vehicle controller 23 may turn on a light included in the vehicle so that it is easy for imaging to be performed. The camera is not limited as long as the camera can image the outside of the vehicle, and may be a camera of an existing drive recorder, side view camera, back view camera, or the like included in the vehicle or may be newly provided. Further, the light to be turned on is not limited as long as the light can illuminate the display unit 11 when the display unit 11 is presented to the camera. An existing headlight, parking light, welcome light, back-up light, room light, or the like included in the vehicle may be used or a light may be newly provided.

(Step S106): When the user directs the display unit 11 of the mobile terminal device 10 to the camera, the camera images the code displayed on the display unit 11. The vehicle controller 23 may turn off the light when the code can be read from a captured image.

(Step S107): The vehicle controller 23 performs authentication based on the imaged code. For example, the vehicle controller 23 holds the same token as the token held by the terminal controller 13, and determines that authentication is successful when the vehicle controller 23 can determine that the imaged code is generated from these tokens. Tokens can be shared, for example, when the mobile terminal device 10 and the vehicle 20 are associated with each other. An algorithm for generating tokens may be shared instead of tokens being shared. When the authentication is successful, the vehicle controller 23 permits unlocking of the door and actually performs the unlocking. Further, the vehicle controller 23 may cause a sound emission unit included in the vehicle to emit a predetermined buzzer sound or turn on a hazard lamp to inform the user that the authentication has succeeded and the door has been unlocked. 100351 (Step S108): The vehicle controller 23 invalidates the imaged code, and prevents the authentication from being successful even when the same code is imaged in the future. The vehicle controller 23 can identify an invalidated code, for example, by imparting a flag indicating that a code has been invalidated, to the token corresponding to the code used for authentication.

Although the sequence ends as described above, the vehicle controller 23 may further permit a manipulation such as engine startup that is performed by the user who has got into the vehicle pressing a push start switch when the authentication in step S107 is successful. Alternatively, the vehicle controller 23 may image the code with, for example, a camera capable of imaging the inside of the vehicle and permit engine startup or the like when re-authentication is successful. When the re-authentication is performed, the process of invalidating a code in step S108 is performed after the re-authentication. When the user ends driving and gets off, for example, the vehicle controller 23 locks a door using an automatic door lock function. Alternatively, when the battery of the mobile terminal device 10 is charged during driving of the vehicle, the mobile terminal device 10 can perform a normal operation with an electronic key at the time of getting off and, for example, can lock the door through a touch manipulation with respect to the door handle.

A method of generating a code and a method of authentication using the code are not limited to those described above, and, for example, a general authentication method based on a one-time pass code can be adopted appropriately.

Further, the display unit 11 may be integrally included in the mobile terminal device 10 or may be an external component connected to a general-purpose connector of the mobile terminal device 10. When the display unit 11 is the external component, the display unit 11 may be attached to a part of a surface of the mobile terminal device 10 or may be sandwiched between the mobile terminal device 10 and a transparent or translucent casing accommodating the mobile terminal device 10.

Further, a solar cell panel and a small capacity storage unit may be provided in the mobile terminal device 10 or the display unit 11, which is the external component. In this case, for example, in step S103, the terminal controller 13 performs a process up to the generation of the code and does not perform the display, and in step S105, the vehicle controller 23 turns on the light. Accordingly, the terminal controller 13 or the like can be at least operated with power generated by the solar cell panel due to light of the light and perform the display of the generated code on the display unit 11. Further, in this case, when the terminal controller 13 detects a predetermined or any button manipulation or a touch panel manipulation performed by the user or when the terminal controller 13 detects that the user moves the mobile terminal device 10 to cause the mobile terminal device 10 to enter a predetermined posture state, using a sensor or the like included in the mobile terminal device 10, the terminal controller 13 may perform the display of the generated code on the display unit 11.

Although steps S102 to S108 described above are executed when the remaining amount of the battery of the mobile terminal device 10 has decreased (step S101) in the embodiment, steps S102 to S108 may be similarly executed, for example, even when the user intentionally sets an in-flight mode in which transmission of radio waves is not performed, or turns power off.

Effects

According to the embodiment, since the code of which the display is maintained on the display unit 11 can be used for authentication for unlocking of the vehicle, or the like even when the remaining amount of the battery of the mobile terminal device 10 has decreased or exhausted, the user possessing the mobile terminal device 10 can perform a manipulation of the vehicle.

Further, when the code is invalidated due to one use as described above, the code cannot be used a plurality of times. Thus, it is possible to reduce a possibility of the vehicle 20 being stolen even when the code is copied by another person. Further, since the code is not displayed on the display unit 11 when the remaining amount of the battery has not decreased, it is possible to reduce an opportunity for others to see the code and reduce a possibility of the code being copied.

Further, it is possible to implement the embodiment by providing the display unit 11 using the electronic paper in the mobile terminal device 10, and providing an application program that causes the terminal controller 13 and the vehicle controller 23 to execute each of the steps described above, and it is possible to desirably suppress cost so that the cost is relatively low.

Further, as another countermeasure at the time of a decrease in the remaining amount of the battery, it is possible to make it easy to continue wireless communication even when the remaining amount of the battery of the mobile terminal device 10 decreases, by using an extremely short distance wireless communication scheme operable with very lower power from a battery, called near field communication (NFC), as a scheme of wireless communication between the mobile terminal device 10 and the vehicle 20. However, for support of the NFC, cost becomes undesirably relatively high due to addition of hardware of the mobile terminal device 10 and the vehicle 20, or modification and addition of software such as an operating system (OS) and a driver program in addition to the application program. Further, hardware for a vehicle manipulation for emergency of a mechanical key, a transponder, or the like can be provided in the mobile terminal device 10, and manipulation guidance can be displayed on the display unit 11, as in JP 2012-087592 A described above. However, it is not generally realistic to provide such hardware for a limited use in a general smartphone, and cost becomes undesirably high.

Second Embodiment

Hereinafter, a second embodiment of the present disclosure will be described in detail with reference to the drawings. Description of the same matters as in the first embodiment will be omitted or simplified.

Configuration

Figure 3:
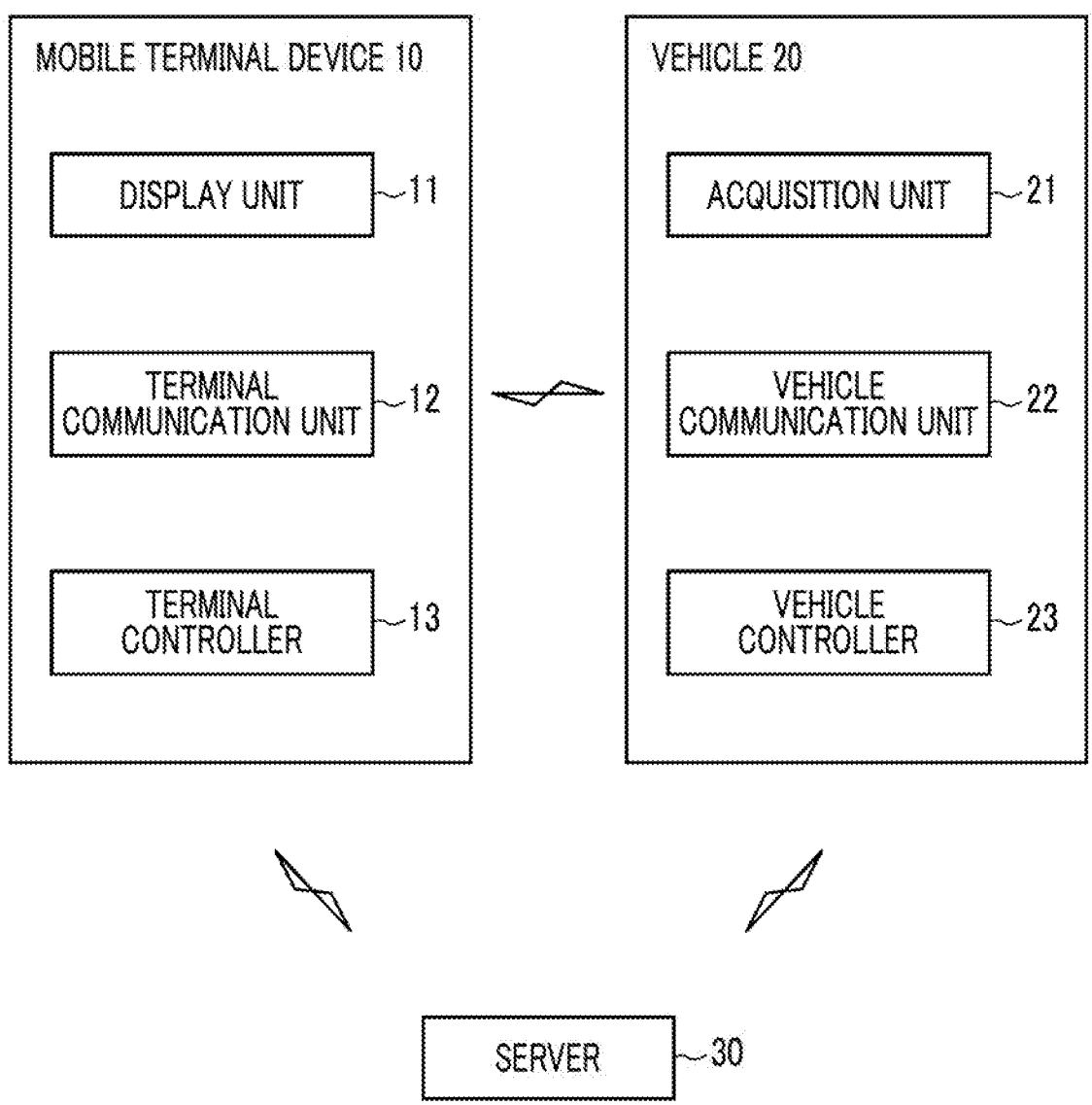
FIG. 3 is a functional block diagram of a vehicle control system according to a second embodiment of the present disclosure.

FIG. 3 illustrates a functional block diagram of a vehicle control system 2 in the second embodiment. The vehicle control system 2 further includes a server 30 in addition to the vehicle control system 1 in the first embodiment. In the second embodiment, the server 30 can manage the association between the mobile terminal device and the vehicle 20 so that the association can be changed, and can use the association for services such as rental car and car sharing services.

The server 30 can change the association between the mobile terminal device 10 and the vehicle 20 according to a combination of the mobile terminal device 10 possessed by the user and the vehicle 20 that permits a manipulation of the user. For example, when the vehicle 20 is a vehicle related to a car rental service or a car sharing service, a user who receives the service, a business person that provides the service, or an owner of the vehicle 20 accesses the server 30 to change the association using a mobile terminal device, a desktop terminal, or the like. In the association, a date and time for validating the association, a type of service, an identifier of the business person, or the like may be further combined. A notification of content of the change is appropriately sent from the server 30 to the mobile terminal device 10 and the vehicle 20, and the change is reflected. Reliability of communication between the server 30 and a device other than the server is desirably guaranteed by authentication, signature, or the like. Of course, even when the vehicle 20 is a private vehicle and solely a user who is an owner uses the vehicle 20, association between the mobile terminal device 10 possessed by the user and the vehicle 20 can be stored in the server 30.

Process

Figure 4:
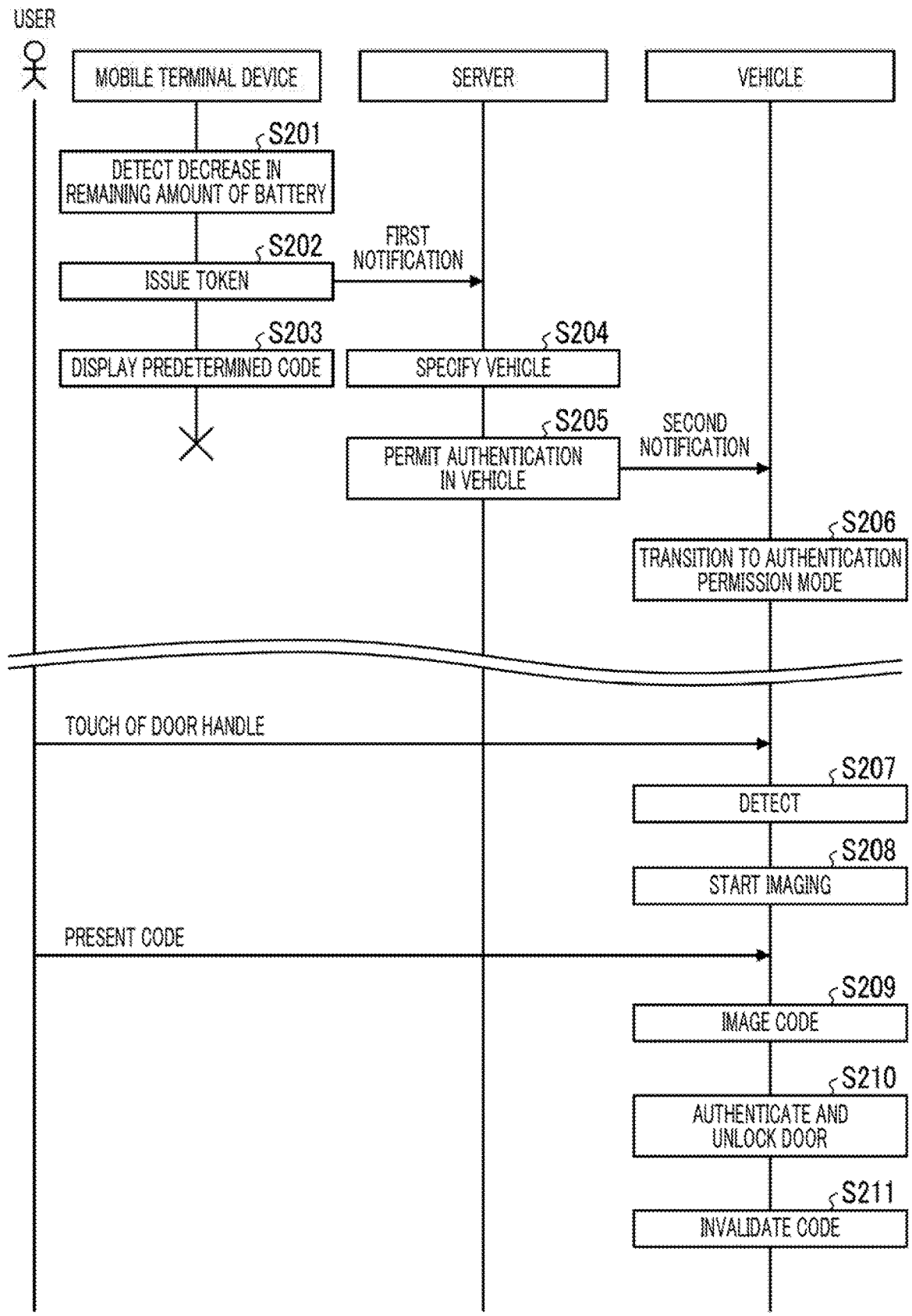
FIG. 4 is a sequence diagram illustrating an example of a process of the vehicle control system according to the second embodiment of the present disclosure.

A process in a case in which the remaining amount of the battery of the mobile terminal device 10 decreases in the vehicle control system 2 according to the second embodiment will be described. FIG. 4 is a sequence diagram illustrating an example of this process.

(Step S201): The terminal controller 13 detects that the remaining amount of the battery built in the mobile terminal device 10 has decreased as in the first embodiment.

(Step S202): The terminal controller 13 issues a token, as in the first embodiment. It is desirable for the token to be a unique token not held by other mobile terminal devices. In the second embodiment, the terminal controller 13 further transmits a notification (a first notification) indicating that the token has been issued, to the server 30 via the terminal communication unit 12. The notification includes, for example, the identifier of the mobile terminal device 10.

(Step S203): The terminal controller 13 generates a code based on the token and causes the display unit 11 to display the code, as in the first embodiment.

After step S203, even when the mobile terminal device 10 enters a shutdown state due to the decrease in the remaining amount of the battery, the electronic paper of the display unit 11 maintains a state in which the code is displayed, as in the first embodiment.

(Step S204): The server 30 receives the first notification transmitted in step S202, and specifies the vehicle 20 associated with the mobile terminal device 10 indicated by the identifier included in the notification. The server 30 stores association between the mobile terminal device 10 and the vehicle 20 in advance, and can specify the vehicle 20 based on this association.

(Step S205): The server 30 permits an authentication process based on the code to be performed by the vehicle 20 specified in step S204, and sends a notification (a second notification) indicating the permission.

(Step S206): When the vehicle controller 23 receives the second notification via the vehicle communication unit 22, the vehicle controller 23 transitions to an authentication permission mode to permit execution of the authentication based on the code.

Processes of steps S207 to S211 below are executed when the user performs an unlocking manipulation of the vehicle after step S206 described above.

(Step S207): When the user touches the door handle, the vehicle controller 23 detects the touch using a sensor included in the vehicle 20, as in the first embodiment. When the mobile terminal device 10 can perform communication, the vehicle controller 23 releases the authentication permission mode. Thereafter, the mobile terminal device 10 and the vehicle 20 may perform a normal operation and do not perform subsequent processes. Even when the vehicle controller 23 does not receive the second notification from the server 30 and does not execute the process of transitioning to the authentication permission mode in step S206, the vehicle controller 23 does not execute subsequent processes.

(Step S208): The vehicle controller 23 starts imaging using, for example, a camera as the acquisition unit 21, as in the first embodiment. Further, the vehicle controller 23 may turn on the light.

(Step S209): When the user directs the display unit 11 of the mobile terminal device 10 to the camera, the camera images the code displayed on the display unit 11, as in the first embodiment.

(Step S210): The vehicle controller 23 performs authentication based on the imaged code, as in the first embodiment. In the second embodiment, the token can be shared, for example, when the mobile terminal device 10 and the vehicle 20 are associated with each other through a notification from the server 30. When the authentication is successful, the vehicle controller 23 permits unlocking of the door and actually performs the unlocking, as in the first embodiment. Further, the vehicle controller 23 may notify the server 30 via the vehicle communication unit 22 that the door has been unlocked. In this case, when the vehicle 20 is a vehicle related to a service such as a car rental service or a car sharing service, the server 30 can transfer a notification indicating that the door has been unlocked to a mobile terminal device, a desktop terminal, or the like of a business person or an owner of the vehicle 20, to notify the business person or the owner of a use situation of the vehicle 20. Such a notification of the use situation of the vehicle 20 to the business person or the owner via the server 30 may be performed not only when the door is unlocked but also when another vehicle manipulation is performed.

(Step S211): The vehicle controller 23 invalidates the imaged code, as in the first embodiment. Further, the vehicle controller 23 releases the authentication permission mode.

Although the sequence ends as described above, the vehicle controller 23 may use the authentication using the code, for authentication for engine startup or the like, as in the first embodiment.

Effects

The same effects as those of the first embodiment can be obtained by the second embodiment. In addition, in the second embodiment, control can be performed as to whether or not the authentication based on the code is permitted in the vehicle 20 based on the association between the mobile terminal device 10 and the vehicle 20 appropriately managed by the server 30. Therefore, it is possible to further reduce a possibility of an unauthorized combination of the mobile terminal device 10 and the vehicle 20 or authentication based on an unauthorized code being performed. Further, it is possible to improve convenience for the business person or the owner by notifying the business person or the owner of a use situation of the vehicle 20 in a service such as a car rental service or a car sharing service.

Application Example

Although the example in which the mobile terminal device 10 is used for control of unlocking or the like of the vehicle 20 has been described in each of the embodiments described above, the mobile terminal device 10 can also be used for other uses as follows.

For example, when a code of a boarding ticket is displayed on the display unit 11 of the mobile terminal device 10 at the time of boarding an aircraft, a boarding procedure can be performed even when a remaining amount of the battery of the mobile terminal device 10 has decreased or exhausted. Further, at places such as event venues, movie theaters, or museums in which it is needed to turn off the power of the mobile terminal device 10, an entry and exit procedure can be performed in a state in which the power is off when a code of check-in information is displayed on the display unit 11 of the mobile terminal device 10 and then the power is turned off.

Further, in a case in which a code for payment is displayed on the display unit 11 of the mobile terminal device 10 so that a purchase procedure is performed at the time of shopping, and when an application is activated in advance and the code is displayed, it is possible to omit a labor for selecting and activating an application of each procedure. Further, in the procedure, solely when the terminal controller 13 detects that the user has moved the mobile terminal device 10 to cause the mobile terminal device 10 to enter a predetermined posture state in order to present the code, the terminal controller 13 may cause the display unit 11 to display the code, thereby reducing an opportunity for others to see the code.

The present disclosure can be recognized not only as a mobile terminal device or a vehicle control system, but also as a vehicle control program in which a vehicle control method or a process to be executed by a computer is described, which is executed by a vehicle, a server, a mobile terminal device, or one or more computers including a processor and a memory, which constitute each unit of the vehicle or the server.

The present disclosure is useful for mobile terminal devices, vehicle control systems, and the like.

What is claimed is:

1. A vehicle control system comprising:
   a mobile terminal device; and
   a vehicle that is associated with the mobile terminal device, wherein:

the mobile terminal device is operated by a battery, performs wireless communication with the vehicle, and is available as an electronic key for the vehicle, wherein the mobile terminal device includes:
- a communication unit operated by the battery and configured to transmit information to the vehicle for authentication;
- a display unit including an electronic paper, the electronic paper configured to maintain a content of the display unit without power consumption, and
- a terminal controller configured to display a predetermined code for unlocking the vehicle on the electronic paper when a voltage of the battery is monitored and a determination is made that a remaining amount has decreased to a voltage equal to or smaller than a predetermined value;

wherein the vehicle includes:
- a camera configured to acquire the predetermined code displayed on the display unit of the mobile terminal device, and
- a vehicle controller configured to cause the camera to acquire the predetermined code when a radio signal from the mobile terminal device is not received after the vehicle controller detected user touch of the vehicle, and permit unlocking of the vehicle when authentication using acquired predetermined code is successful;
  - wherein the vehicle controller is configured to cause the authentication not to be successful even when the camera acquires again the predetermined code used for the successful authentication after the authentication is successful, and the camera acquires the predetermined code by imaging the predetermined code.

2. The vehicle control system according to claim 1, wherein the vehicle controller is configured to turn on a light included in the vehicle and perform imaging using the camera in a case in which the radio signal from the mobile terminal device is not receivable when the vehicle controller detects a touch manipulation with respect to a door handle included in the vehicle.

3. A vehicle control system comprising:
a mobile terminal device;
a vehicle that is associated with the mobile terminal device; and
a server configured to communicate with the mobile terminal device and the vehicle,
wherein:
the mobile terminal device is operated by a battery, performs wireless communication with the vehicle, and is available as an electronic key for the vehicle, and
the mobile terminal device includes:
- a communication unit operated by the battery and configured to transmit information to the vehicle for authentication;
- a display unit including an electronic paper, the electronic paper configured to maintain a content of the display unit without power consumption, and
- a terminal controller configured to display a predetermined code for unlocking the vehicle on the electronic paper when a voltage of the battery is monitored and the terminal controller determines that a remaining amount has decreased to a voltage equal to or smaller than a predetermined value, the vehicle includes;
- an acquisition unit configured to acquire the predetermined code displayed on the display unit of the mobile terminal device, and
- a vehicle control;

the terminal controller is configured to further transmit a first notification to the server when the remaining amount of the battery is equal to or smaller than the predetermined value;

the server is configured to specify the vehicle as the vehicle associated with the mobile terminal device and transmit a second notification to permit the vehicle to execute authentication with the predetermined code when the server receives the first notification; and the vehicle controller is configured to cause the acquisition unit to acquire the predetermined code, and permit unlocking of the vehicle when authentication using the acquired predetermined code is successful in a case in which a radio signal from the mobile terminal device is not received after the vehicle controller detected user touch of the vehicle when the vehicle controller receives the second notification.

4. The vehicle control system according to claim 3, wherein the vehicle controller is configured to cause the authentication not to be successful even when the acquisition unit acquires again the predetermined code used for the successful authentication after the authentication is successful.

5. The vehicle control system according to claim 3, wherein the acquisition unit is a camera that acquires the predetermined code by imaging the predetermined code.

6. The vehicle control system according to claim 5, wherein the vehicle controller is configured to turn on a light included in the vehicle and perform imaging using the camera in a case in which the radio signal from the mobile terminal device is not receivable when the vehicle controller detects a touch manipulation with respect to a door handle included in the vehicle.

* * * * *